(12) United States Patent
Selvaraj

(10) Patent No.: US 10,474,508 B2
(45) Date of Patent: Nov. 12, 2019

(54) REPLICATION MANAGEMENT FOR HYPER-CONVERGED INFRASTRUCTURES

(71) Applicant: VMWARE, INC., Palo Alto, CA (US)

(72) Inventor: Karthick Selvaraj, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 130 days.

(21) Appl. No.: 15/680,236

(22) Filed: Aug. 18, 2017

(65) Prior Publication Data

US 2019/0012211 A1 Jan. 10, 2019

(30) Foreign Application Priority Data

Jul. 4, 2017 (IN) .............................. 201741023443

(51) Int. Cl.
| | | |
|---|---|---|
| *G06F 11/14* | (2006.01) | |
| *G06F 3/06* | (2006.01) | |
| *G06F 9/50* | (2006.01) | |
| *H04L 12/911* | (2013.01) | |

(52) U.S. Cl.
CPC .............. *G06F 9/5077* (2013.01); *G06F 3/06* (2013.01); *G06F 11/1464* (2013.01); *H04L 47/70* (2013.01); *G06F 2201/815* (2013.01)

(58) Field of Classification Search
None
See application file for complete search history.

(56) References Cited

U.S. PATENT DOCUMENTS

| | | | | |
|---|---|---|---|---|
| 8,429,140 B1* | 4/2013 | Lolayekar | ............. | G06F 16/289 707/694 |
| 8,560,671 B1* | 10/2013 | Yahalom | ............. | H04L 67/1097 709/224 |
| 8,874,457 B2* | 10/2014 | Biran | ................. | G06Q 10/0637 705/7.12 |
| 9,052,938 B1* | 6/2015 | Bhide | ................. | G06F 9/45533 |
| 9,740,520 B1* | 8/2017 | Sarda | ................. | G06F 9/45558 |
| 9,942,114 B1* | 4/2018 | Arora | ..................... | G06F 11/30 |
| 10,146,636 B1* | 12/2018 | Ghare | ................. | G06F 11/1464 |
| 2011/0035747 A1* | 2/2011 | Machida | ................... | G06F 8/63 718/100 |
| 2011/0125894 A1* | 5/2011 | Anderson | ............ | H04L 9/3213 709/224 |
| 2012/0054624 A1* | 3/2012 | Owens, Jr. | ............ | G06F 9/5072 715/735 |
| 2012/0109958 A1* | 5/2012 | Thakur | ................ | G06F 16/122 707/737 |

(Continued)

*Primary Examiner* — Isaac T Tecklu
(74) *Attorney, Agent, or Firm* — Thomas Horstemeyer, LLP

(57) ABSTRACT

Disclosed are various examples of replication management for hyper-converged infrastructures. Virtual machine groups are generated using k-means grouping based on a process list of a respective virtual machine of a plurality of virtual machines within a hyper-converged infrastructure. Virtual machines in a respective group are analyzed to determine a first set of resources. A property graph that includes configuration data including a storage resource configuration and a network resource configuration is generated for the first set of resources of the respective virtual machine group. A second set of resources is configured within a second workload domain using the storage resource configuration and the network resource configuration.

20 Claims, 8 Drawing Sheets

(56) References Cited

U.S. PATENT DOCUMENTS

| | | | |
|---|---|---|---|
| 2012/0303670 A1* | 11/2012 | Gillen | G06F 9/5072 707/797 |
| 2013/0007506 A1* | 1/2013 | Jain | G06F 11/1484 714/4.12 |
| 2013/0024722 A1* | 1/2013 | Kotagiri | G06F 11/1004 714/6.1 |
| 2014/0223431 A1* | 8/2014 | Yoshimura | G06F 9/45558 718/1 |
| 2014/0250232 A1* | 9/2014 | Liu | H04L 41/0896 709/226 |
| 2014/0280961 A1* | 9/2014 | Martinez | H04L 41/5054 709/226 |
| 2015/0052524 A1* | 2/2015 | Raghu | G06F 9/455 718/1 |
| 2015/0154046 A1* | 6/2015 | Farkas | G06F 9/485 718/1 |
| 2015/0261577 A1* | 9/2015 | Gilbert | G06F 9/5044 718/1 |
| 2015/0261578 A1* | 9/2015 | Greden | G06F 9/5044 718/1 |
| 2015/0288569 A1* | 10/2015 | Agarwal | H04L 41/12 709/224 |
| 2016/0048408 A1* | 2/2016 | Madhu | G06F 11/1458 718/1 |
| 2016/0094477 A1* | 3/2016 | Bai | H04L 47/786 709/226 |
| 2016/0283281 A1* | 9/2016 | Antony | G06F 9/5055 |
| 2016/0291990 A1* | 10/2016 | Bhatia | G06F 9/44505 |
| 2016/0366218 A1* | 12/2016 | Cors | H04L 67/1095 |
| 2017/0060705 A1* | 3/2017 | Sridhara | G06F 11/1662 |
| 2017/0109212 A1* | 4/2017 | Gaurav | G06F 9/45533 |
| 2017/0235815 A1* | 8/2017 | Bhatt | G06F 16/00 718/1 |
| 2018/0225311 A1* | 8/2018 | Bandopadhyay | G06F 11/1484 |
| 2018/0359162 A1* | 12/2018 | Savoy | H04L 41/5051 |
| 2019/0007410 A1* | 1/2019 | Hu | H04L 63/10 |

\* cited by examiner

REPLICATION MANAGEMENT FOR HYPER-CONVERGED INFRASTRUCTURES

RELATED APPLICATIONS

Benefit is claimed under 35 U.S.C. 119(a)-(d) to Foreign Application Serial No. 201741023443 filed in India entitled "REPLICATION MANAGEMENT FOR HYPER-CONVERGED INFRASTRUCTURES", on Jul. 4, 2017, by VMware, Inc., which is herein incorporated in its entirety by reference for all purposes

BACKGROUND

A hyper-converged infrastructure can provide an enterprise with modular and expandable compute, memory, storage, and network resources. In a hyper-converged infrastructure, compute, memory, storage, and network resources are brought together using preconfigured and integrated hardware. Tasks can be allocated to hardware that is capable of performing the allotted task. When a task requires more resources, additional hardware can be assigned to the task, for example, using virtualization software.

However, it can become difficult to effectively replicate the infrastructure and software to protect applications from uncertain events. Replication for continuity and disaster recovery can require deployment engineers and development teams to collaborate to find which virtual machines are working together closely to deliver an application service. As virtual machines are added and removed, replication can be a continuous process of reviewing infrastructure growth and adding virtual machines to a continuity and disaster recovery plan. Since these infrastructures can involve thousands of virtual machines, and the application infrastructure can change frequently, figuring out which virtual machines are closely related and configuring the virtual machines and their hardware requirements for replication can require repetitive and manual effort. This can become frustrating for administrators, IT professionals, and end users alike, as well as impede productivity.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
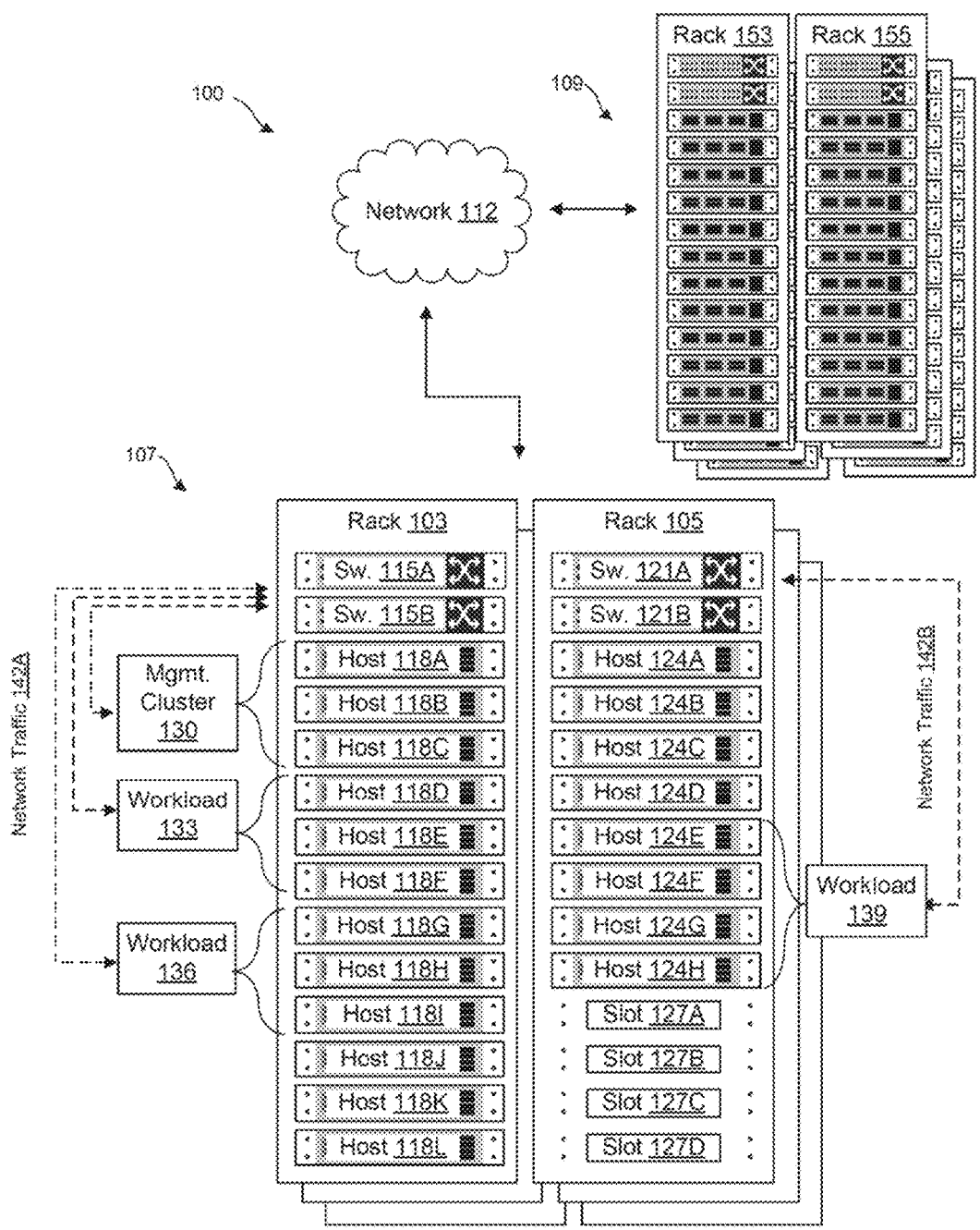
FIGS. 1A and 1B are drawings of an example of a networked environment including components connected through a network.

The present disclosure relates to replication management for hyper-converged infrastructures and other infrastructures for providing compute, memory, storage, and network resources that are brought together using integrated hardware that in some cases can be difficult to scale-up, but additional hardware can be added to scale-out the infrastructure. When a task or application requires more resources, additional virtual machines and additional hardware can be assigned to the task, for example, using virtualization software. As virtual machines and hardware are added and removed, figuring out which virtual machines are closely related and configuring the virtual machines and their hardware requirements for replication can require repetitive and manual effort. This can become frustrating for administrators, IT professionals, and end users alike, as well as impede productivity. However, the examples described in the present disclosure include mechanisms capable of alleviating or eliminating these problems, for example, through systems and methods that implement replication management for hyper-converged infrastructures.

Software instructions can provide and assign resources using containers called workload domains. A workload domain can be a physical collection of compute, memory, storage, and network resources that provide uniform characteristics to applications and tasks such as security, data protection, performance, availability, and modular expandability. A workload domain can perform or execute tasks, including applications, programs, and other instructions. While an established workload domain can be assigned any desired task, workload domains can have a particular purpose or usage characteristics. As discussed, there can be various types of workload domains. During the creation of workload domains, the application or task requirements of the workload or workflow can be translated to physical infrastructure requirements including a number of hosts to assign to the workload, each having compute, memory, storage, and network devices. The applications, tasks or other functionalities can be performed or brought up on the chosen hardware.

According to some examples, program instructions can be executed in at least one computing device. The at least one computing device can identify a process list for a respective virtual machine of a plurality of virtual machines associated with a first workload domain within a hyper-converged infrastructure. A plurality of virtual machine groups can be generated from the plurality of virtual machines using k-means grouping based at least in part on the process list for the respective virtual machine, a subset of the plurality of virtual machines being grouped within a respective virtual machine group of the plurality of virtual machine groups.

The subset of the plurality of virtual machines can be analyzed to determine a first set of resources associated with the respective virtual machine group. The first set of resources can include at least one storage resource and at least one network resource. A property graph can be generated. The property graph can include configuration data for the first set of resources associated with the respective virtual machine group. The configuration data can include a storage resource configuration and a network resource configuration. A second set of resources within a second workload domain can be configured using the property graph for the respective virtual machine group. The second set of resources can be configured based at least in part on the storage resource configuration and the network resource configuration.

The configuration data can further include a first naming convention for the first set of resources, and the second set of resources can be configured with a second naming convention based at least in part on the first naming convention for the first set of resources. In some cases, the configuration data can further include a virtual-machine-to-virtual-machine affinity rule or a virtual-machine-to-host affinity rule.

In some cases, a replicated version of the subset of the plurality of virtual machines can be generated within the second workload domain. The replicated version of the subset of the plurality of virtual machines can utilize the second set of resources. In some examples, a user interface element can be generated, which when activated assigns a tag to a particular virtual machine that is grouped within the respective virtual machine group. The tag can then be assigned to other virtual machines grouped within the subset of the plurality of virtual machines. In some situations, the tag can further be associated with or assigned to the at least one storage resource and the at least one network resource of the first set of resources.

With reference to FIG. 1A, shown is an example of a networked environment 100. The networked environment 100 can have components including racks 103 and 105 of a site 107 and racks 153 and 155 of a site 109 in communication with one another over a network 112. The network 112 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, cellular networks, telephony networks, and other types of networks. The network 112 can also include switches, routers, and other network devices. The network devices can include network devices that are held or integrated within racks and network devices that are external to the racks.

In some cases, the rack 103 can be a rack that is part of a hyper-converged infrastructure having compute, memory, storage, and network resources that are provided using integrated and/or preconfigured hardware. In other cases, a rack can be part of a converged infrastructure or another type of infrastructure. The rack 103 can have a number of switches or a number of slots for switches or other network devices. For example, the rack 103 can have switches 115A and 115B. The switches 115A and 115B can be top-of-rack switches or other integrated network devices of the rack 103. While not shown, the switches 115 can also be further connected to other switches and network devices of the site 109, including spine switches, End-of-Row switches, Middle-of-Row switches, or other switches, routers, and the like. The rack 103 can also include a number of hosts or a preconfigured number of slots or bays for hosts. For example, the rack 103 can have hosts 118A-118L (hosts 118). Where the rack 103 is part of a hyper-converged infrastructure, each of the hosts 118 can include hardware that provides compute, memory, storage, and network resources. Each of the hosts 118 can be connected to the network 112 through the switches 115A and 115B. For example, the host 118 can include two network interface cards (NIC)s connected to the switches 115A and 115B. Individual ones of the hosts 118 can be connected to both a port of the switch 115A and a port of the switch 115B. While the hosts 118 are connected to the network 112 through the switches 115A and 115B, the switches 115A and 115B can be considered a part of the network 112, as can network cards or controllers of the individual hosts.

Similarly, the rack 105 can also include a number of hosts or a preconfigured number of slots or bays for hosts. For example, the rack 105 can have hosts 124A-124L (hosts 124) as well as slots 127A-127D (slots 127). The slots 127 can accommodate or accept additional hosts to expand the compute, memory, storage, network, and other resources provided by the rack 105. Where the rack 105 is part of a hyper-converged infrastructure, each of the hosts 124 can include hardware that provides compute, memory, storage, and network resources. Each of the hosts 124 can be connected to the network 112 through the switches 121A and 121B. For example, individual ones of the hosts 124 can be connected to both a port of the switch 121A, and a port of the switch 121B. The switches 121A and 121B can be considered a part of the network 112, as can network cards or controllers of the individual hosts.

For example, each of the hosts 118 and 124 can be a processor-based system, such as a computer system, and can include at least one computing device, at least one storage device, and at least one network device. While referred to in the singular for clarity, multiple computing devices, storage devices, and network devices can be included in each host. The computing device can include a processor circuit, such as one that includes a processor and a memory. The storage devices can include memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components. A network device can include network interface controllers or network interface cards (NICs), switches, routers, and other network devices. A network device can also process computer instructions using at least one computing device within the network device.

The hardware resources including switches, NICs and other network devices, as well as hosts and other devices, can be utilized to perform or execute instructions, including processes, programs, applications, and other tasks assigned to the host, for example, using software like the SDDC manager 203. VMware vSphere®, vSAN®, NSX®, ESX®, ESXi®, and other virtualization software and tools can also be executed in the management cluster 130 and the various hosts, and can work in concert with, and can be considered part of, the SDDC manager 203. While the SDDC manager 203 can be executed in the management cluster 130, some software components can be executed by the other hosts, switches, and other hardware components. The software components and tools can cause the hardware components of the hosts, including hosts 18 and 124, and switches, including the switches 115 and 121, to define clusters and workload domains that provide compute, memory, storage, and network resources, according to configuration data 218 that includes policies, settings, and capability details associated with these resources. Accordingly, resources can include hardware and software resources. In some cases, the hardware resources can execute the virtualization software and tools to provide virtual resources.

A cluster can include hardware and infrastructure components including a set of hosts or machines, and can be associated with cluster-level policies, settings, capabilities and other configuration data 218. For example, a cluster-level policy or setting can specify that multiple data stores that are part of the cluster (e.g., included in the hosts) are aggregated or grouped into a virtual data store or virtual storage area network (SAN) that can be accessed as a resource for storage. Cluster-level policies can also indicate whether a distributed resource scheduler (DRS) is to be used for the cluster. These policies can also be defined at a host level or a workload domain level. Storage characteristics like capacity, security, encryption, and availability of the virtual data store can be defined by capabilities of the hardware and software associated with the virtual data store. The virtual data store can also be configured to provide different virtual machines with a different quality of service (QoS) level. A virtual machine can be assigned to utilize a virtual data store, and can be assigned a particular QoS level in a storage policy or profile associated with the virtual machine that can ensure that the virtual machine is provided a specific level of capacity, performance, availability, redundancy, or other QoS level or setting. The virtual machine storage policy can be matched with a virtual data store having sufficient capability to provide the QoS level specified in the policy.

A workload domain can utilize a set of one or more clusters or hosts and can be associated with workload-domain-level policies, settings, capabilities and other configuration data 218. In some cases, a cluster can require a minimum number of hosts, for example, three hosts, or another number of hosts.

The configuration data 218 can define different domain types, security, capacity, availability, and performance policies, settings, and capabilities for establishing workload domains and clusters. Workload domains can be utilized to provide infrastructure to perform workflows, applications, and tasks. Workload domains can provide infrastructure as a service (IaaS), platform as a service (PaaS), desktop as a service (DaaS)/virtual desktop infrastructure (VDI). These can be considered workload domain types, and workload domain types can further include test and development workload domain types, production workload domain types, and other domain types that can include any of these services or a combination of these and other services. Each domain type can be associated with a particular set of policies, settings, and capabilities for the workload domain. The configuration data 218 can also define network security settings including firewall settings, security group settings, and IP address specifications. Encryption settings can also be defined. Configuration data can further define non-interference settings, such as levels for non-interference for concurrent tasks in a workload domain, so that they do not interfere with one another. Availability settings can include durations of continuous operation expected for a workload domain. Availability settings can also refer to a level of or number of failures including hardware failures, malfunctions, unexpected adverse behaviors, or other failures that can be tolerated before the workload domain functionality is compromised. Configuration data can also include performance policies, settings, and capabilities. This can include specification of size in terms of megabytes, gigabytes, terabytes, or other appropriate measure. Configuration data can further include specific compute or CPU hardware settings, for example, using gigahertz, terahertz, number of processors, power efficiency settings and other units and specifications. Configuration data for one workload domain or cluster can be made distinct from configuration data 218 for another workload domain or cluster. Any of the configuration data 218 can be defined through policies implemented at a host level, cluster level, and workload domain level.

A production workload domain can, for example, be used for providing VDI. Users can access typical desktop environments, operating systems, applications, and the like. Production workload domains can require dedicated bandwidth or fewer network interruptions to provide the best customer experience. Production workload domains can be assigned to hosts that are relatively nearby to target users, for example, on-site with target users or at a remote site having a high-quality network connection for target users.

A test and development workload domain can, for example, be used for providing IaaS, SaaS, and other services and tasks for test and development. For example, test and development workload domains can provide an environment with infrastructure components, storage solutions, and applications for test and development, as well as handle tasks including system maintenance and software execution.

A disaster recovery workload domain can provide IaaS, SaaS, and other services and tasks for disaster recovery. For example, disaster recovery workload domains can provide an environment with infrastructure components, storage solutions, and applications for disaster recovery, temporary or permanent replacement of other workload domains, recovery of other workload domains, system maintenance, and the like.

A management workload domain such as the management cluster 130, can be used for providing software defined data center (SDDC) functionality. The SDDC functionality can be provided through policy-based data center management software. The SDDC functionality can allow administrators to centrally monitor and administer all workload domains, applications, and tasks across individual sites or multiple sites, including local hardware, private cloud, public cloud, and hybrid cloud deployments. Administrators can deploy and manage workload domains in physical, virtual, and cloud environments with a unified management experience through a management workload domain executing SDDC functionality. Management workload domains can also be referred to as a management cluster.

These types of workload domains are illustrative, and any type or naming convention can be used for types of workload domains. For example, new workload domains can be assigned to a particular preconfigured workload domain type, or a user-created custom workload domain type. Also, existing workload domains can execute particular applications and can be assigned to a type after they are initially established by analysis of the applications and tasks performed by the particular workload domain, for example, if they match a profile of a particular preconfigured workload domain type or a user-created custom workload domain type. While certain functionalities are discussed regarding particular types of workload domains, any of the functionalities and applications can also be provided by these and other workload domains. For example, internet of things (IoT) functionalities, AirWatch® functionalities, VMware® Photon OS, and other functionalities and application types can be provided. During the creation of workload domains, the applications and tasks to be performed can be translated to physical infrastructure requirements including compute, memory, storage, and network requirements. In some cases, the applications and tasks performed and the compute, memory, storage, and network requirements can be used to determine a particular host to assign to the workload domain at creation.

A single physical rack can support multiple workload domains. Also, a single workload domain can be assigned hosts from multiple different physical racks and hosts from multiple sites or locations. For example, any of the hosts 118, hosts 124, or hosts of the replication site 109 can be assigned to a workload domain. A single workload domain can be assigned to multiple hosts 118 of the rack 103. In some cases, a cluster of hosts 118 or multiple clusters can be assigned to a workload domain. Also, a single workload domain can be assigned a host from the rack 103, a host from the rack 105, and a host from a remote site. It should be noted that in some cases, the site 107 can be a private cloud site, and the replication site 109 can be a remote site can be a public cloud site, such that the networked environment 100 can be considered a hybrid cloud environment. In other cases, each of the sites 107 and 109 can be private, or each of the sites 107 and 109 can be public.

Referring again to FIG. 1A, the rack 103 and the rack 105 can be part of the site 107, which can be considered a local site. Racks 153 and 155 can be provided at the replication site 109, which can in some cases be a remote site or another local site. The replication site 109 is discussed in further detail in FIG. 1B. In some cases, one or more of the sites can be provided by a service that provides compute, memory, storage, network, and other resources to an enterprise or another customer of the service. In other cases, one or more of the site can also be owned or operated by the enterprise. In this example, the replication site 109 can be utilized for replication to provide disaster recovery and continuity for local site 107. In some cases, replicated workload domains at the replication site 109 can be in a similar configuration as the active workload domains at the site 107. For example, the workload domains can utilize a similar number of switches and can be provided similar network configuration so the resources of the replication site 109 can perform the same as the active workload domains at the site 107. In some cases, the another remote site can include other active workload domains, such that the active workload domains, such as the management cluster 130 and the workload domains 133, 136, and 139, can include resources at multiple sites, including local and remote sites.

The hosts 118A, 118B, and 118C can be assigned to a management workload domain or management cluster 130. The management cluster 130 can provide the physical resources to execute a workload that includes a SDDC and other functionality that can allow administrators to centrally monitor and administer all workload domains, applications, and tasks across individual sites or multiple sites, including local hardware, private cloud, public cloud, and hybrid cloud deployments. The management cluster 130 can be utilized to add processes to virtual machines, virtual machines to workload domains, assign particular hosts to workload domains, and add additional hosts to a particular workload domain when needed. In addition, the management cluster 130 can reassign or shift workload domains to use different hosts, for example, by assigning a new host to the workload domain and then removing a previous host from the workload domain. The management cluster 130 can also manage replication and can include a replication manager in a suite of software or instructions that can be executed in the management cluster 130.

Configuration data can include workflow data, such as a list of virtual machines on each workload domain, a list or processes on each virtual machine. Workflow data can also include which virtual machines are dependent on or work with other virtual machines. The management cluster 130 can analyze network traffic from the switches throughout the system in local and remote sites including the site 107 and the site 109 to determine or identify virtual machines, processes of each virtual machine, and which virtual machines or system processes are working together in concert. For example, the management cluster 130 can analyze packets transmitted through the switches to determine that when a first process in a first virtual machine sends a first type of data, a second process in a second virtual machine sends a second type of data (e.g., based on a threshold number or percentage of occurrence). In addition, the management cluster 130 can send queries, requests, or otherwise communicate with the various workload domains including the workload domains 133, 136, and 139 to determine the list of virtual machines executed in each workload domain, as well as the processes list or tasks performed by each virtual machine. Workflow data can be obtained, in some cases, by transmitting a request to an API or causing a command to be entered through a command line interface (CLI), for example, using Secure Shell (SSH) or ESXi shell. ESX, ESXi, and vSphere® CLIs and APIs can be utilized to obtain workflow data and other configuration data 218.

The physical hosts 118A-C can be connected to the network 112 through the switches 115A and 115B. Accordingly, each of the hosts 118A-118C can be connected to a port of the switch 115A and to a port of the switch 115B. The functionalities provided through the management cluster 130 can monitor and analyze network traffic 142, including network traffic 142A to and from the hosts 118 through the switches 115, as well as the network traffic 142B to and from the hosts 124 through the switches 121.

The hosts 118D, 118E, and 118F of the rack 103 can be assigned to a workload domain 133. The workload domain 133 can provide the physical resources to execute functionality or a workload including applications and tasks. The physical hosts 118D, 118E, and 118F can be connected to the network 112 through the switches 115A and 115B. Accordingly, each of the hosts 118D-118F can be connected to a port of the switch 115A and to a port of the switch 115B. In other cases, hosts from different racks and different sites can be assigned to a single workload domain. Likewise, the hosts 118G, 118H and 118I of the rack 103 can be assigned to a workload domain 136 that provides the physical resources to execute functionality or a workload including applications and tasks. The physical hosts 118G-I can each be connected to the network 112 through the switches 115A and 115B. The hosts 118J-118L can be unassigned and can later be assigned to a workload domain.

The hosts 124A-124D of the rack 105 can be connected to the network 112 through the switches 121A and 121B of the rack 105. The hosts 124A-124D can be unassigned and can later be assigned to a workload domain. The hosts 124E-H can be assigned to a workload domain 139 that provides the physical resources to execute functionality or a workload including applications and tasks. The hosts 124E-H can be connected to the network 112 through the switches 121A and 121B of the rack 105.

A set of resources associated with the site 107 can include hardware resources and virtual resources. The hardware resources can include the switches 115A-B, switches 121A-B and the hosts 118A-L, and hosts 124A-H. The hosts can be part of respective clusters, as well as the respective workload domains, and can be associated with cluster-level and workload-domain-level configuration data 218. This configuration data 218 can include the policies, settings, and capabilities of the clusters, and the workload domains. This configuration data 218 can be obtained, in some cases, by sending a request for this data to an API such as a vSphere® API. In other cases, the data can be obtained by scanning or inspecting packets of the network traffic 142A and 142B that are transmitted through the switches 115A-B, 121A-B, or other switches of the site 107. Header data and other data of the packets can be inspected or scanned to obtain the configuration data 218.

The switches, including the switches 115A-B and switches 121A-B, can be configured in the configuration data 218 to have virtual ports that are associated with and can be accessed using port groups. The port groups are also assigned to and associated with a virtual machine. Port groups can be used to define virtual port resources with particular sets of specifications as a virtual machine connects through a virtual port. Port groups can specify that a given virtual machine should has a particular type of connectivity on any host on which it might run. The port group can include a virtual port name or identifier, virtual switch name, or identifier. The identifiers can use a naming convention that is associated with a virtual network resource of at least one of the switches 115A-B and switches 121A-B. Port groups can capture all the settings for a switch port. In order to specify a particular type of connectivity, a virtual machine can specify the name or identifier of a port group with an appropriate definition.

Figure 1B:
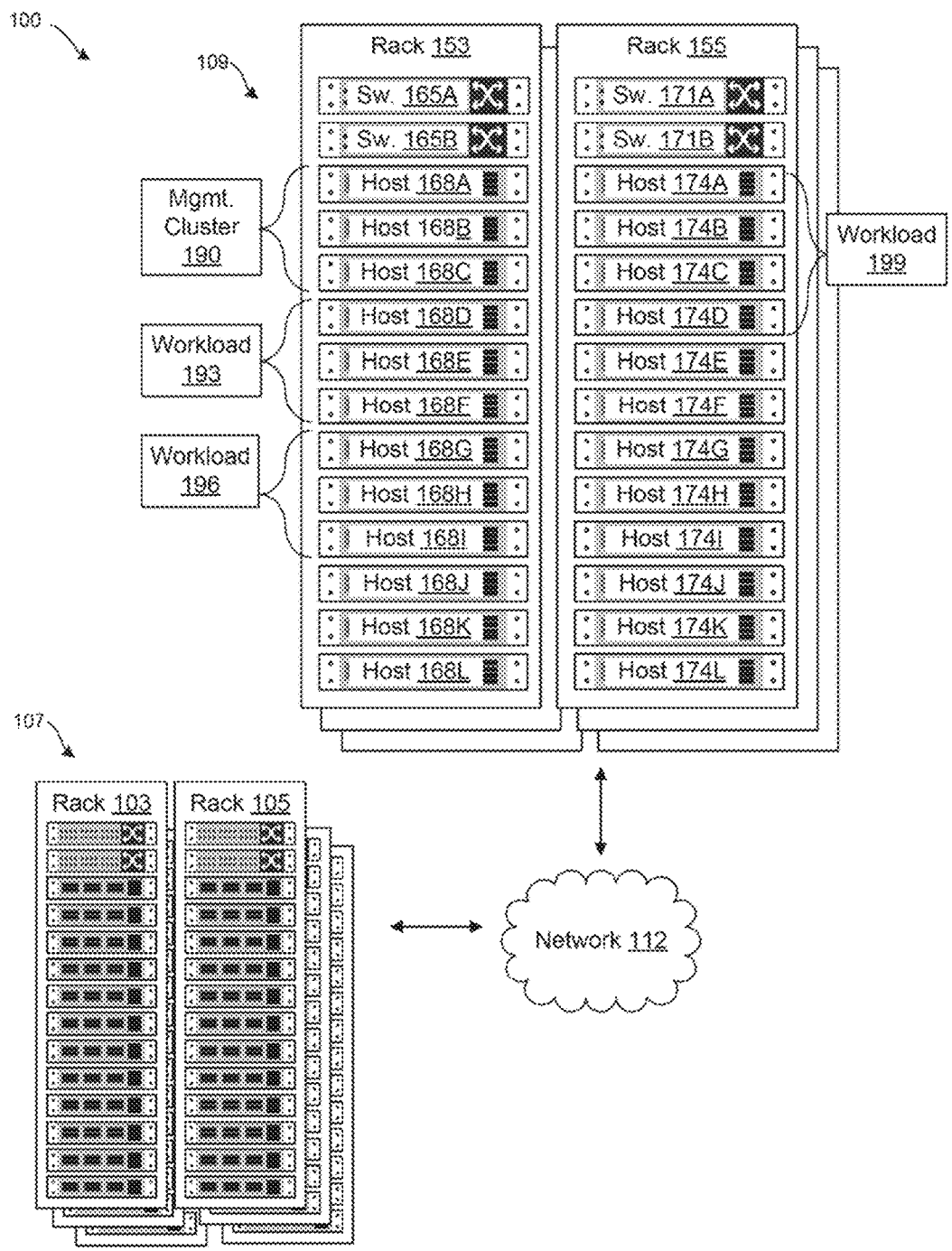

With reference to FIG. 1B, shown is the networked environment 100 of FIG. 1A, that includes greater detail of the racks 153 and 155 of the replication site 109. The rack 153 can include the switches 165A-B and the hosts 168A-L. The hosts 168A-L can each be connected to the switches 165A-B. The rack 155 can include the switches 171A-B and the hosts 174A-L.

Workload domains including the management cluster 130 and the workload domains 133, 136, and 139 of FIG. 1A can be replicated to the replication site 109. For example, the management cluster 130 of FIG. 1A, or another service that is not part of the management cluster 130, can perform replication management functionalities. The management cluster 190 can provide the physical resources to execute a workload that includes a SDDC and other functionality that can allow administrators to centrally monitor and administer all workload domains, applications, and tasks across individual sites or multiple sites, including local hardware, private cloud, public cloud, and hybrid cloud deployments.

The management cluster 190 can be a replicated version of the management cluster 130 of FIG. 1A. Accordingly, the hosts 168A, 168B, and 168C can be assigned to a management workload domain or management cluster 190. The physical hosts 168A-C can be connected to the network 112 through the switches 165A and 165B. Accordingly, each of the hosts 168A-168C can be connected to a port of the switch 165A and to a port of the switch 165B.

The workload domain 193 can be a replicated version of the workload domain 133 of FIG. 1A. Accordingly, the hosts 168D, 168E, and 168F of the rack 153 can be assigned to a workload domain 193. The workload domain 193 can provide the physical resources to execute functionality or a workload including applications and tasks. The physical hosts 168D, 168E, and 168F can be connected to the network 112 through the switches 165A and 165B. Accordingly, each of the hosts 168D-168F can be connected to a port of the switch 165A and to a port of the switch 165B.

The workload domain 196 can be a replicated version of the workload domain 136 of FIG. 1A. Accordingly, the hosts 168G, 168H and 168I of the rack 153 can be assigned to a workload domain 196 that provides the physical resources to execute functionality or a workload including applications and tasks. The physical hosts 168G-I can each be connected to the network 112 through the switches 165A and 165B. The hosts 168J-168L can be unassigned and can later be assigned to a workload domain, for example, for disaster recovery or any type of workload domain.

The workload domain 199 can be a replicated version of the workload domain 139 of FIG. 1A. The hosts 174A-174D of the rack 155 can be connected to the network 112 through the switches 171A and 171B of the rack 155. The hosts 174E-L can be unassigned.

A set of resources associated with the site 109 can include hardware resources and virtual resources. The hardware resources can include the switches 165A-B, switches 171A-B and the hosts 168A-L, and hosts 174A-L. The hosts can be part of respective clusters as well as the respective workload domains, and can be associated with cluster-level and workload-domain-level configuration data 218. This configuration data 218 can include the policies, settings, and capabilities of the clusters, and the workload domains. During replication, the set of resources for the site 109 can be configured using the configuration data 218 from the site 107. For example, the host-level, cluster-level, and workload-domain-level policies, settings, and capabilities associated with the set of resources of the site 107 can be replicated to the resources of the site 109. The software, such as virtual machine images and settings associated with each of the workload domains, can also be replicated from the site 107 to the site 109.

Figure 2:
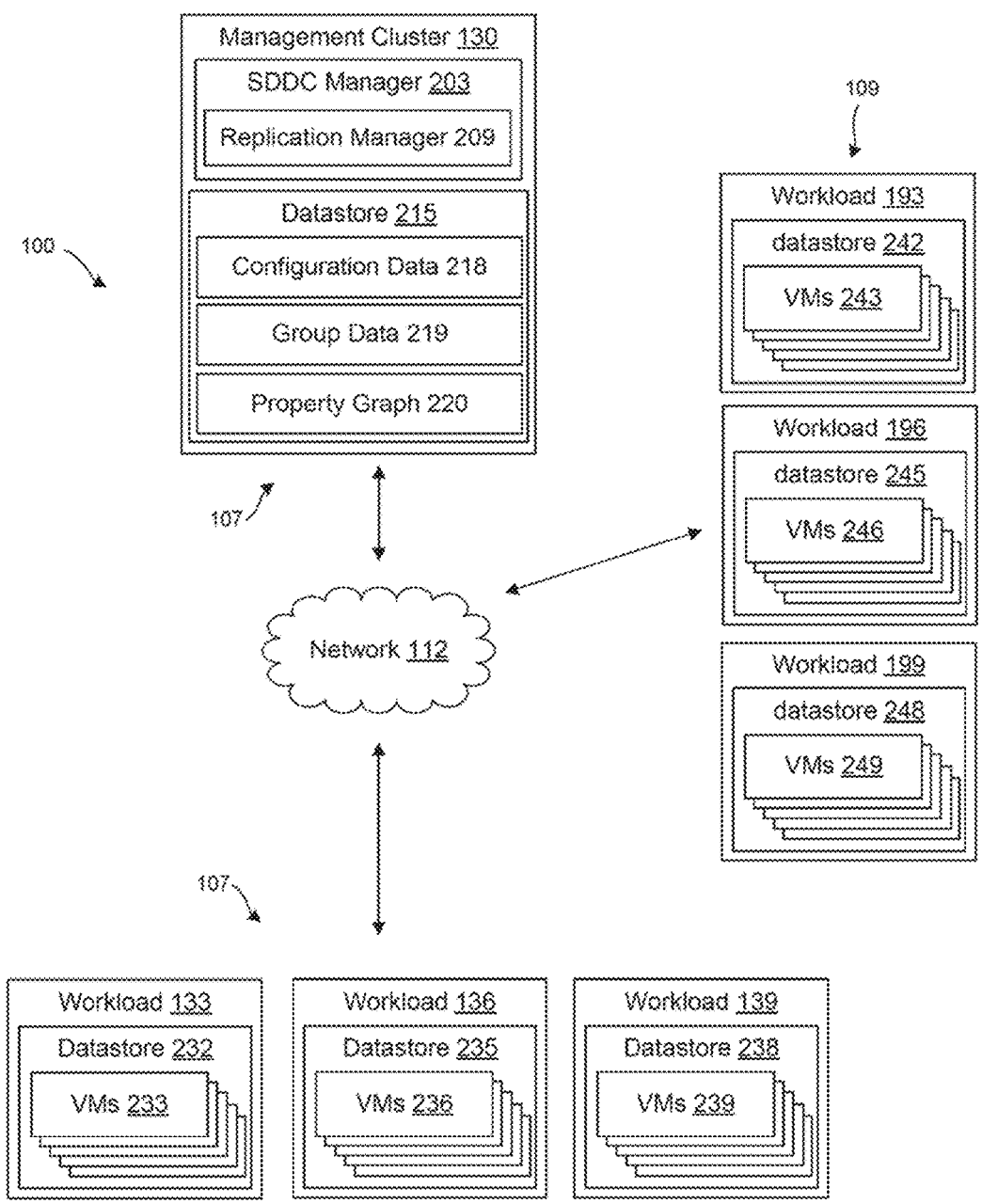
FIG. 2 is a drawing further illustrating components of the networked environment connected through the network.

Referring to FIG. 2, shown is an example of components of the networked environment 100 in communication through the network 112. The management cluster 130 can execute an SDDC manager 203. In some cases, the SDDC manager 203 is executed in one or more a virtual machines that provide the SDDC functionalities. The SDDC manager 203 can allow administrators to centrally monitor and administer all workload domains, applications, and tasks across individual sites or multiple sites, including local hardware, private cloud, public cloud, and hybrid cloud deployments. Administrators can deploy and manage workload domains in physical, virtual, and cloud environments with a unified management experience through at least one user interface generated by management cluster 130 executing the SDDC manager 203. VMware vSphere®, vSAN®, NSX®, ESX®, ESXi® and other virtualization software and tools can also be executed in the management cluster 130 and various hosts and can work in concert with, and can be considered part of, the SDDC manager 203. The SDDC manager 203 can include subroutines, modules, or applications including replication manager 209 in a suite of software or instructions that can be executed in the management cluster 130 and the various hosts. The replication manager 209 can alternatively be independently executed applications or tasks that can be executed by an external service.

The management cluster 130 can store the SDDC manager 203, the replication manager 209, and additional applications or programs in a data store of the management cluster 130. A datastore 215 of the management cluster 130 can store configuration data 218, group data 219, a property graph 220, as well as the SDDC Manager 203, replication manager 209, and other software, tasks, applications, and data.

The configuration data 218 can include settings, capabilities, and policies for the hardware resources, workload domains, clusters, virtual resources, virtual machines, and processes to be replicated. In some cases, the configuration data 218 can also define which workload domains and virtual machines to replicate, and an order or priority of replication for each workload domain and virtual machine.

The group data 219 can include groups of virtual machines that are determined using k-means grouping based on process lists and port groups of each virtual machine of a set of virtual machines. The set of virtual machines can be all virtual machines in a site, or multiple sites, for replication, or all virtual machines stored in, or executed by, a workload domain, such as the workload domains 133, 136, 139, and the management cluster 130.

The property graph 220 can include configuration data 218 or a subset of the configuration data 218 that can be used to relate and maintain the entire infrastructure of a site or multiple sites and can be queried or parsed to generate information for recreating the infrastructure setup at the replication site 109. In some cases, the property graph 220 can include dependency data for each of the virtual machines and can be considered a dependency graph. Nodes and edges can connect the nodes and can have properties maintained as a mapping (e.g., map <key, value>). This can maintain relationship among to nodes, and the properties can be defined dynamically at run time. Each virtual machine can be represented as a node in the property graph 220. Workload domains, clusters, switches, port groups, virtual data stores, virtual ports, and other configuration data 218 can be included in the property graph 220. While the property graph 220 is referred to in the singular, multiple property graphs 220 can be stored, accessed, and displayed in sections or at any level of granularity. For example, a displayed or accessed version of a property graph 220 can be limited to a certain subset of the configuration data 218 within the property graph.

The datastore 215 can be representative of multiple disks, drives, and other memories that are included in any of the hosts 118A-118C that are assigned to the management cluster 130. In some examples, the datastore 215 can be a virtual data store that can provide access to the disks, drives, and other memories according to a policy of a virtual machine. The configuration data 218 can also include groups of virtual machines.

The workload domain 133 can include a datastore 232 that includes the virtual machines 233. The datastore 232 can be a virtual data store that provides access to physical hard drives and data stores of hosts assigned to the workload domain 133. The datastore 232 can have capabilities according to the physical hard drives and data stores of hosts assigned to the workload domain 133. Each of the virtual machines 233 can be provided access to according to a respective policy that defines a QoS, capacity, or setting, for a respective virtual machine of the virtual machines 233. Each of the virtual machines 233 can be assigned to utilize the virtual data store 232, for example, using a datastore name or identifier associated with the datastore 232. The workload domain 133 can also perform application tasks, VDI functionalities, IaaS functionalities, SaaS functionalities, IoT functionalities, VMware® Photon OS, AirWatch®, and other functionalities and application types can be provided by executing the processes of each of the virtual machines 233 of the workload domain 133.

The SDDC manager 203 can determine a list of the virtual machines 233, by transmitting a request for the virtual machine list to an API associated with software executed by the workload domain 133 or accessing a CLI associated with software executed by the workload domain 133. Each virtual machine 233 can include programs, applications, instructions, and other processes that are executed by the workload domain 133. A list of these processes can be determined by transmitting a request for the virtual machine list to an API associated with software executed by the workload domain 133, or accessing a CLI associated with software executed by the workload domain 133. The SDDC manager 203 can also determine this workflow data and other configuration data 218 by analyzing and inspecting packets transmitted through switches of the site 107, 109, and other switches and network components of the network 112.

The workload domain 136 can include a datastore 235 that includes the virtual machines 236. The datastore 235 can have capabilities according to the physical hard drives and data stores of hosts assigned to the workload domain 136. The datastore 235 can also be a virtual data store that provides the virtual machines 236 access to these resources according to a respective storage policy that defines a QoS, capacity, or setting for a respective virtual machine of the virtual machines 236. Likewise, the workload domain 139 can include a datastore 238 that includes the virtual machines 239, and can provide the virtual machines 239 access to these resources according to a policy of a respective virtual machine of the virtual machines 239.

The SDDC manager 203 (e.g., the replication manager 209) can analyze network traffic from the switches throughout the system in local and remote sites including the site 107 and the site 109 to determine or identify virtual machines, processes of each virtual machine, and which virtual machines or system processes are working together in concert. The SDDC manager 203 can send queries, requests, or otherwise communicate with the various workload domains including the workload domains 133, 136, and 139 to determine the list of the virtual machines 233, 236, and 239 that are executed in each workload domain, as well as the processes list or tasks performed by each virtual machine. This workflow data can be obtained, in some cases, by transmitting a request to an API or causing a command to be entered through a CLI, for example, using SSH. ESX, ESXi, and vSphere® CLIs and APIs can be utilized to obtain workflow data and other configuration data 218.

The workload domains 193, 196 and 199 can be replicated versions of the workload domains 133, 136, and 139 respectively. Accordingly, the workload domain 193 can have a datastore 242 that stores virtual machines 243, which can be replicated versions of the virtual machines 233. The workload domain 196 can have a datastore 245 that stores virtual machines 246, which can be replicated versions of the virtual machines 236. Likewise, the workload domain 199 can have a datastore 248 that stores virtual machines 249, which can be replicated versions of the virtual machines 239. The SDDC manager 203 can configure, or apply a configuration to, the resources of the workload domains 193, 196, and 199 at the replication site 109 using the workflow data and other configuration data 218 associated with a particular group of virtual machines.

Accordingly, the SDDC manager 203 can replicate the workload domains 133, 136, and 139 of the site 107 to the workload domains 193, 196 and 199 of the replication site 109. For example, to workload domain 133 to the site 109, the SDDC manager 203 can determine workflow data including a process list for each of the virtual machines 233 and port groups that are used by each of the virtual machines 233 of the workload domain 133. The SDDC manager 203 can apply a k-means grouping or another grouping algorithm that can generate a number of groups from the virtual machines based on the workflow data for each virtual machine of the virtual machines 233. The k-means grouping can group the virtual machines 233 into a number of virtual machine groups, each group including similar or otherwise related virtual machines. The groupings can be stored in the group data 219.

The SDDC manager 203 can provide a user interface through which an administrative user can mark or tag a virtual machine from each group. The SDDC manager 203 can then automatically tag the remainder of the virtual machines in each group with a group tag. Also, the SDDC manager 203 can provide a user interface through which an administrative user can assign a group tag to the group directly rather than to a particular one of the virtual machines in the group. In some examples, the group tag can include a name or identifier that uses a particular naming convention. The name of the tag can be any character string, and can in some cases can represent a type of the virtual machines in the group. A group tag named "webservers" can indicate that the virtual machines in the group are website servers or related to website servers by the k-means grouping or other grouping algorithm. A group tag named "appservers" can indicate that the virtual machines in the group are application servers or related to application servers by the k-means grouping or another grouping algorithm. Group tag names can also indicate a cluster or port group.

In some situations, such as regenerating groups, or when a tag has been assigned before groups have been generated, some of the virtual machines 233 can already have existing tags assigned. In this case, the SDDC manager 203 can determine a group tag that represents a majority of the existing tags, and can apply that tag to all of the virtual machines. Alternatively, the SDDC manager 203 can notify an administrator and provide a user interface that through which an administrate user can choose or assign an appropriate tag to resolve the group tag that is assigned to each group.

As the infrastructure grows, additional virtual machines can be added to the virtual machines 233 of the workload domain 133. When a new virtual machine gets added, it can be added to existing groups using k-nearest neighbor or another grouping algorithm that can determine that the new virtual machine is related to a particular one of the existing groups based on the workflow data for the new virtual machine, like its process list and port groups. In some cases, this workflow data can be entered or obtained through a user interface of the SDDC manager 203 as the new virtual machine is created and added. In other situations, the SDDC manager 203 can detect the new virtual machine as it monitors of the workload domain 133, for example by transmitting a request for a virtual machine list to APIs or CLIs associated with the workload domain 133 and analyzing the network traffic through the switches. A process list for the new virtual machine can be determined by transmitting a request for a process list to the APIs or CLIs associated with the new virtual machine and analyzing the network traffic through the switches. Periodically, or after a predetermined number of new virtual machines are added, the SDDC manager 203 can regenerate groups by repeating the k-means grouping rather than performing k-nearest neighbor grouping. This can be repeated for each workload domain 133, 136 and 139.

Once the virtual machines 233 are grouped or classified under the various group tags, the SDDC manager 203 can determine the resources that are supporting the particular group. The SDDC manager 203 can determine the virtual data stores, physical datastores, and other storage resources, as well as virtual ports, port groups, switches, and other network resources that support the subset of the virtual machines 233 in the particular group. The resources can also be determined using a file associated with a virtual machine. The SDDC manager 203 can examine the file to determine network resources like port group(s) and virtual data store(s) used for each virtual machine having the group tag of the particular group.

The SDDC manager 203 can assign the group tag of the particular group to each of the resources utilized by the group of virtual machines. Group tags can be reused in subsequent grouping and tagging processes. For example, groups out of the virtual machines 236 can utilize some of the group tags used for groups out of the virtual machines 233. Additional group tags or fewer group tags can be used. Accordingly, a group can include a subset of the virtual machines 233 from the workload domain 133, and can further include a subset of the virtual machines 236 from the workload domain 136, and all other workload domains to be replicated.

The SDDC manager 203 can also fetch or determine the configuration data 218 associated with the resources utilized by the group of virtual machines. The configuration data 218 for the resource can be obtained, in some cases, by sending a request for this data to an API such as a vSphere® API associated with the resource, and by analyzing files associated with each virtual machine in the group.

The SDDC manager 203 can also generate a property graph 220. The property graph 220 can include nodes and edges that can connect the nodes can have properties maintained as a mapping (e.g., map <key, value>). This can help us to precisely maintain relationship among to nodes and the properties can be defined dynamically at run time. Each virtual machine can be represented as a node in the property graph 220. Workload domains, clusters, switches, port groups, virtual data stores, virtual ports, and other configuration data 218 can be included in the property graph 220.

The property graph 220 can be generated related to a replication target. In some cases the replication target can include configuration data 218 for an entire site or multiple sites. In other cases, the replication target can be a particular workload domain, or a particular group of virtual machines, and the property graph 220 can be generated with configuration data 218 from the particular workload domain or particular group of virtual machines. While referred to as a graph, the property graph 220 can also be stored in other forms, such as a list or table format that includes the mapping of the configuration data 218.

The SDDC manager 203 can configure a set of resources at the replication site 109. For example, SDDC manager 203 can configure resources of one or more of the workload domains 193, 196, and 199, as well as switches and network resources at the replication site 109 using the configuration data 218 for the tagged resources that support the particular virtual machine group from the site 107. SDDC manager 203 can also generate replicated versions of the virtual machines from the particular virtual machine group. The replicated versions of the virtual machines from the particular virtual machine group can utilize the set of resources at the replication site 109.

Figure 3A:
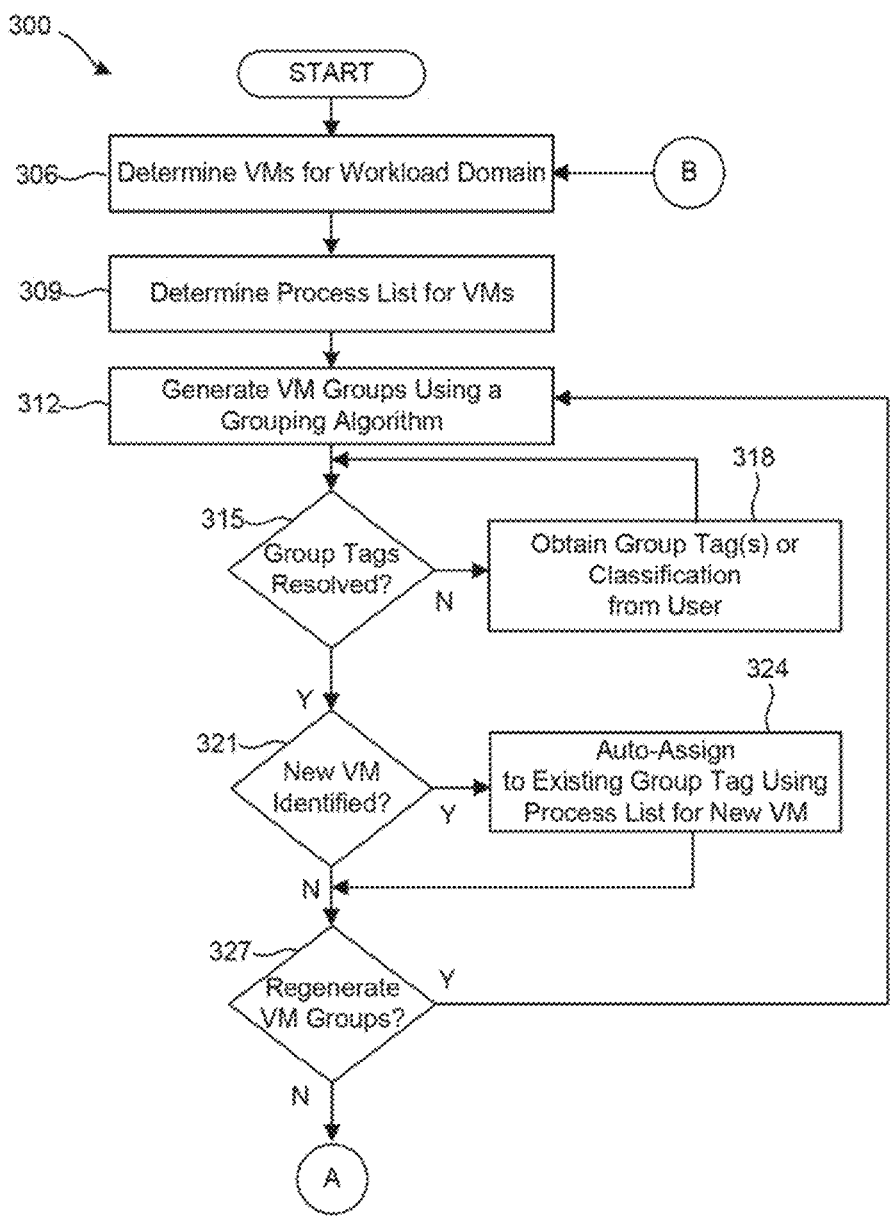
FIGS. 3A and 3B illustrate an example flowchart of functionalities implemented by components of the networked environment.

Referring to FIG. 3A, shown is an example flowchart 300 describing steps that can be performed by the components of the networked environment 100 of FIGS. 1A and 1B. Generally, the flowchart 300 describes how the management cluster 130 executing the replication manager 209 provides replication management. In some cases, the SDDC manager 203 can perform the functionalities of the flowchart 300, and in other cases, the replication manager 209 can be a service executing external to the SDDC manager 203.

In step 306, the SDDC manager 203 can determine a list of virtual machines for a workload domain. In this example, the workload domain can be the workload domain 133. The SDDC manager 203 can analyze network traffic 142A-B from the switches throughout the system in local and remote sites including the site 107 and the site 109 to determine or identify a list of virtual machines executed by a workload domain. For example, the SDDC manager 203 can inspect a packet that is transmitted through the switches and can determine that a virtual machine of the virtual machines 233 and the workload domain 133 are associated with the packet. Header data or other data in the packet can identify that the virtual machine caused the packet to be transmitted through the switch. The data can also identify the host (e.g., 118D-F), cluster, and workload domain 133. Alternatively, the packet can be transmitted through a port of one of the switches 115A-B, that is connected to one of the hosts 118D-F of the workload domain 133. Accordingly, a virtual machine of the virtual machines 233 can be associated with the workload domain 133 by analyzing the network traffic 142 and a list of virtual machines (e.g., all or some of the virtual machines 233) can be generated for the workload domain 133.

Additionally or alternatively, SDDC manager 203 can send request for the list of virtual machines to the workload domain 133 or a host 118D-F of the workload domain 133 to determine the list of virtual machines. The request for the list of virtual machines can be transmitted to an API or a command can be caused to be entered through a CLI (e.g., vm process list, vim-cmd vmsvc/getallvms). The list of virtual machines can be a list of all virtual machines 233 or can be a list of running virtual machines out of the virtual machines 233. ESX, ESXi, and vSphere® CLIs and APIs can be utilized to obtain workflow data including the list of virtual machines and other configuration data 218.

In step 309, the SDDC manager 203 can determine a process list for each of the virtual machines 233 identified in the list of virtual machines associated with the workload domain 133. The SDDC manager 203 can analyze network traffic 142 from the switches throughout the system in local and remote sites including the site 107 and the site 109 to determine or identify a process list for each of the virtual machines 233 executed by the workload domain 133. For example, the SDDC manager 203 can inspect a packet that is transmitted through a switch and can determine that a particular process and a particular virtual machine are associated with the packet. In some cases, header data or other data in the packet can identify a virtual machine as well as the process that caused the packet to be transmitted through the switch. The data can also identify the host, cluster, or workload domain. Accordingly, a process can be associated with a virtual machine by analyzing the network traffic and a process list for the virtual machine can be generated.

Additionally or alternatively, SDDC manager 203 can send request for the process list of a particular virtual machine to a host 181D-F of the workload domain 133 to determine the process list. The request for the process list of the particular virtual machine can be transmitted to an API or can cause a command to be entered through a CLI (e.g., system process list). ESX, ESXi, and vSphere® CLIs and APIs can be utilized to obtain workflow data including the list of virtual machines and other configuration data 218.

Port groups can also be identified for each virtual machine 233 in the list of virtual machines. For example, the SDDC manager 203 can inspect a packet that is transmitted through a switch and can determine that the packet is transmitted using a particular port group identifier, or through a virtual port that a particular port group identifier is associated with. Additionally or alternatively, the SDDC manager 203 can inspect a file associated with a virtual machine to identify a port group that is assigned to the virtual machine or a list of port groups.

In step 312, the SDDC manager 203 can generate virtual machine groups using k-means grouping. In other examples, k-harmonic, Gaussian, and other grouping algorithms can be used. The k-means grouping can be applied to the process lists of each virtual machine. For instance, each process list can be utilized, for example, as a file or document. K-means grouping can be applied to generate groups out of the virtual machines in the list of virtual machines associated with the workload domain. The port groups can be included in the file or document, and the k-means grouping can consider the process list and the port group(s) for each virtual machine. K-means grouping and other grouping algorithms can also include weighted factors, and the weightings can be adjusted or altered to optimize desired results. Factors can include weight for the port group, a weight for the process list, and weights for particular processes in the process list. For example, some system processes can be ubiquitous and can have a lesser weight than processes in the process list that are more rare, or more likely to result in meaningful groupings. In some situations, all of the virtual machines of all workload domains can be aggregated, and k-means grouping can be applied to make groups out of a pool of all virtual machines to be replicated.

In step 315, the SDDC manager 203 can determine whether group tags are resolved. For example, group tags can be considered resolved if there is at least one tag applied to a virtual machine within the group and there are no conflicts between existing group tags in a resulting group after k-means grouping is applied. A conflict can arise when different group tags have been applied or assigned to two different virtual machines within the group. Accordingly, group tags are not resolved when different group tags have been applied or assigned to two different virtual machines within the group. Group tags are considered not resolved if no group tags have yet been applied to any of the virtual machines within the group, such as where a first time the replication is performed in this manner, or where a new group has been formed through k-means grouping. If group tags are not resolved, the SDDC manager 203 can move to step 318. Otherwise, if group tags are resolved, the SDDC manager 203 can move to step 321.

In step 318, the SDDC manager 203 can obtain group tag assignments from an administrator or another user. For example, the SDDC manager 203 can provide a user interface that includes a user interface element through which a user can define (e.g., type or select) a group tag and assign the group tag to a group of virtual machines directly, or to a particular one of the virtual machines in the group. Where the user defines a tag to a particular virtual machine of the group, the SDDC manager 203 can then automatically tag the remainder of the virtual machines in the group with the group tag. In some examples, the group tag can include a name or identifier that uses a particular naming convention. The name of the tag can be any character string, and can in some cases can represent a type of the virtual machines in the group. The SDDC manager 203 can move back to step 315, and this can be repeated for each group of virtual machines until the group tags are resolved, and the SDDC manager 203 can move to step 321.

In step 321, the SDDC manager 203 can determine whether a new virtual machine is identified. For example, an administrator can change or expand a workflow or application, and the change or expansion can include a new virtual machine of the virtual machines 233 executed in the workload domain 133. This can be performed in a manner similar to step 306, including analyzing network traffic from the switches and/or sending a request for a list of virtual machines. Where the SDDC manager 203 determines that a new virtual machine is identified, the SDDC manager 203 can move to step 324. Otherwise, the SDDC manager 203 can move to step 327.

In step 324, a new virtual machine can be added to existing groups using k-nearest neighbor based on the workflow data for the new virtual machine, like its process list and port groups. In some cases, this workflow data can be entered or obtained through a user interface of the SDDC manager 203 as the new virtual machine is created and added. In other situations, the SDDC manager 203 can detect the new virtual machine as it monitors of the workload domain 133, for example by transmitting a request for a virtual machine list to APIs or CLIs associated with the workload domain 133 and analyzing the network traffic through the switches. A process list for the new virtual machine can be determined by transmitting a request for a process list to the APIs or CLIs associated with the new virtual machine and analyzing the network traffic through the switches.

In step 327, the SDDC manager 203 can determine whether to regenerate virtual machine groups. For example, the SDDC manager 203 can determine to regenerate virtual machine groups periodically, such as after a predetermined time, or after a predetermined number of new virtual machines are added, or the grouping algorithm has been changed to another grouping algorithm, or weights have been changed among the weighted factors used in the grouping algorithm. If the SDDC manager 203 determines to regenerate virtual machine groups, the SDDC manager can move to step 312. Otherwise, if the SDDC manager 203 determines to regenerate virtual machine groups, the SDDC manager 203 can move to step 333 of FIG. 3B.

Figure 3B:
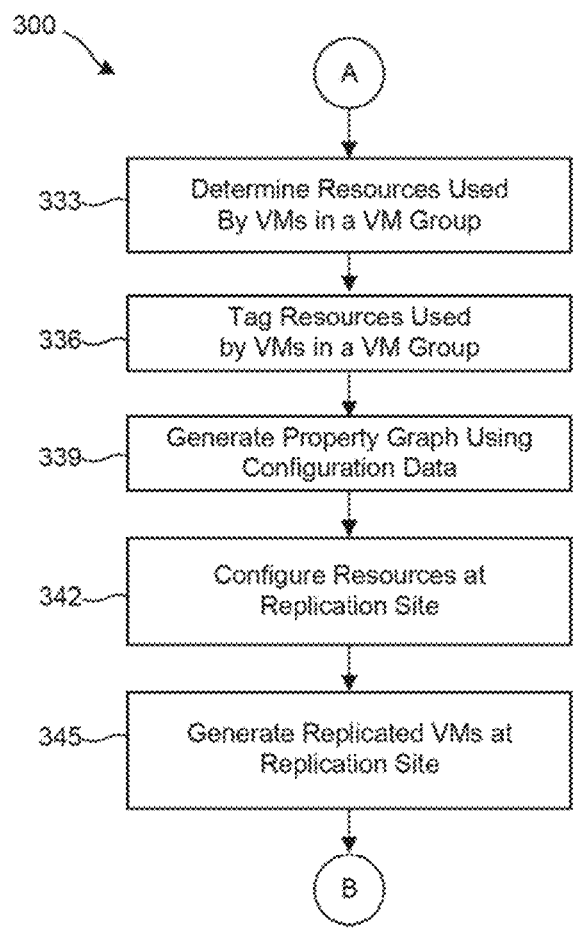

FIG. 3B continues the example flowchart 300 describing steps that can be performed by the components of the networked environment 100 of FIGS. 1A and 1B. In step 333, the SDDC manager 203 can determine a set of resources that are used by a group of virtual machines. For example, the SDDC manager 203 can determine the virtual data stores, physical datastores, and other storage resources associated with a virtual machine in the group of virtual machines. Likewise, the SDDC manager 203 can determine virtual ports, port groups, switches, and other network resources that support the subset of the virtual machines 233 in the particular group. The set of resources can be generated by repeating this for each virtual machine in the group. The resources can also be determined by analyzing the network traffic and by using a file associated with a virtual machine. For example, the SDDC manager 203 can examine the file to determine network resources like port group(s) and virtual data store(s) used for each virtual machine having the group tag of the particular group.

In step 336, the SDDC manager 203 can assign the group tag for the group of virtual machines to each of the resources that are utilized by the group. Group tags can be reused in subsequent grouping and tagging processes. Accordingly, these resources can be considered tagged resources.

In step 339, the SDDC manager 203 can generate a property graph 220 using configuration data 218 associated with resources utilized by the group of virtual machines. The SDDC manager 203 can obtain the configuration data 218 associated with the resources utilized by the group of virtual machines. In some cases, this data can be already determined as discussed in previous steps, and can be stored in a data store for later access. The configuration data 218 for the resource can be obtained, in some cases, by sending a request for this data to an API such as a vSphere® API associated with the resource, and by analyzing files associated with each virtual machine in the group.

The property graph 220 can include nodes and edges that can connect the nodes can have properties maintained as a mapping (e.g., map <key, value>). This can help us to precisely maintain relationship among to nodes and the properties can be defined dynamically at run time. Each virtual machine can be represented as a node in the property graph 220. Workload domains, clusters, switches, port groups, virtual data stores, virtual ports, and other configuration data 218 can be included in the nodes and edges of the property graph 220.

The property graph 220 can maintain the entire infrastructure and can be queried or parsed to generate information for recreating the infrastructure setup at the replication site 109. In some cases, the property graph 220 can include dependency data for each of the virtual machines, and can be considered a dependency graph. In some cases, property graph 220 nodes that are vsphere-specific can be marked to be processed first during generation of replicated resources at the replication site 109.

In step 342, the SDDC manager 203 can setup or configure a set of resources at the replication site 109. For example, SDDC manager 203 can configure resources of one or more of the workload domains 193, 196, and 199, as well as configure switches 165A-B and 171A-B and other network resources at the replication site 109 using the configuration data 218 for the tagged resources from the site 107.

In step 345, the SDDC manager 203 can generate replicated versions of the virtual machines from the particular virtual machine group, within the resources of the replication site. The replicated versions of the virtual machines from the particular virtual machine group can utilize the set of resources at the replication site 109. Thereafter, the SDDC manager 203 can move to step 306 of FIG. 3A and the process can be repeated, for example, to maintain and update the management cluster 190 and workload domains 193, 196, and 199 as changes are made to the management cluster 130, and workload domains 133, 136, and 139.

Figure 4:
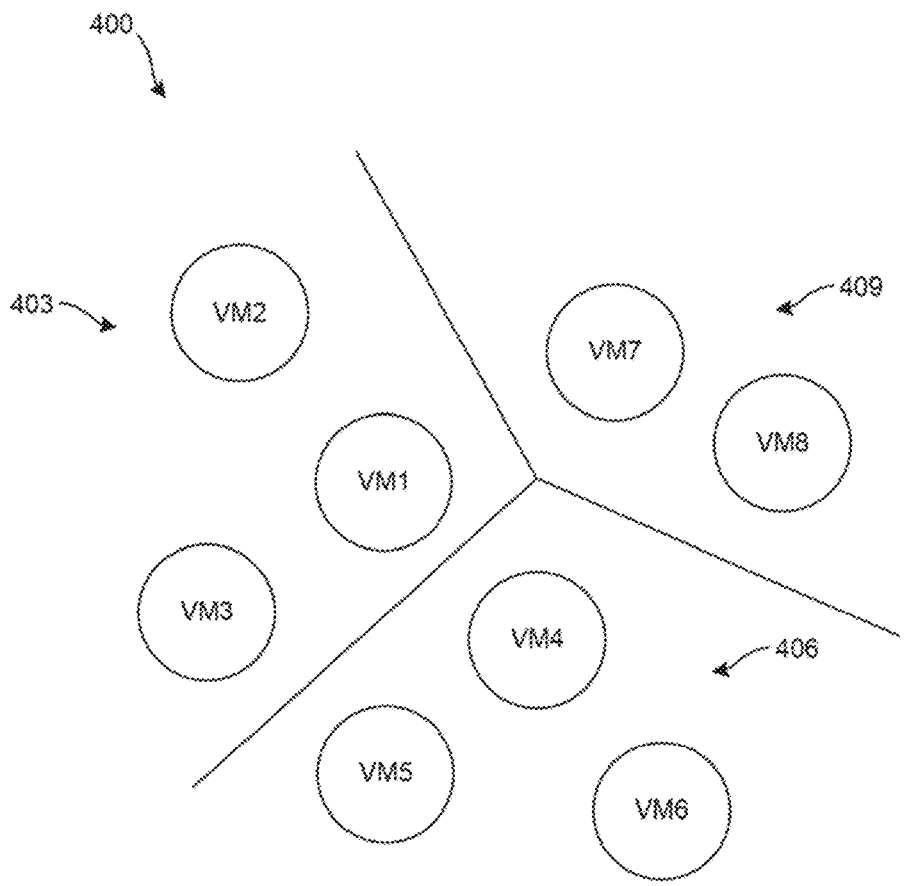
FIG. 4 is a drawing that illustrates an example grouping of virtual machines implemented by components of the networked environment.

In FIG. 4, shown is an example of a set of virtual machines 400. The set of virtual machines 400 can be stored in the group data 219. The set of virtual machines 400 can be grouped into a virtual machine group 403, a virtual machine group 406, and a virtual machine group 409. The virtual machine group 403 can include the virtual machine 1, virtual machine 2, and virtual machine 3. The virtual machine group 406 can include the virtual machine 4, virtual machine 5, and virtual machine 6. The virtual machine group 409 can include the virtual machine 7 and virtual machine 8.

The set of virtual machines 400 can be from a single workload domain or multiple workload domains and can be identified as discussed earlier. Each of the virtual machines can be associated with a process list and can also be associated with one or more port groups. The process list and the port groups can be included in a file, table, or other data. A grouping algorithm, such as k-means grouping, can be applied to the set of virtual machines 1-8 using their respective process lists and port groups.

The k-means grouping can result in the virtual machine groups 403, 406, and 409. Accordingly, the virtual machines 1-3 can be considered similar virtual machines by the k-means grouping based on their process lists and port groups and can be grouped into the group 403. The virtual machines 4-6 can be considered similar virtual machines by the k-means grouping based on their process lists and port groups and can be grouped into the group 406. The virtual machines 7 and 8 can be considered similar virtual machines by the k-means grouping based on their process lists and port groups and can be grouped into the group 409.

Figure 5:
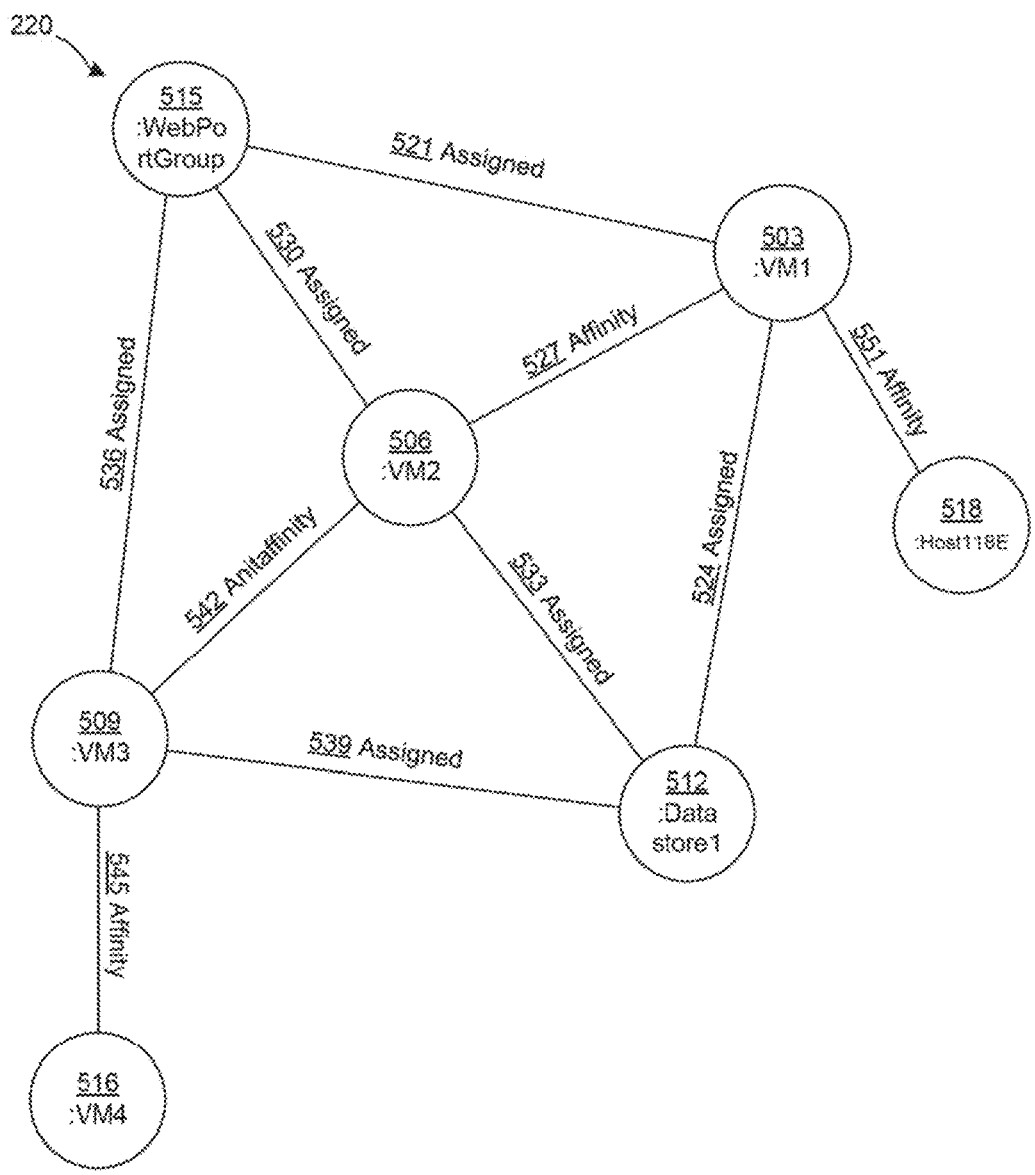
FIG. 5 is a drawing that illustrates an example property graph of virtual machines implemented by components of the networked environment.

FIG. 5 shows an example of a property graph 220. The property graph 220 is shown having nodes 503, 506, 509, 512, 515, 518, and 516. The property graph 220 can also include edges 521, 524, 527, 530, 533, 536, 539, 542, 545, and 551. The node 503 can identify the virtual machine 1, for example, using a value, identifier, or character string (e.g., "VM1"). While not shown, the node 503 can also indicate or list additional data like a type or category of node (e.g., virtual machine, data store, virtual data store, host, or port group) and additional configuration data related to the virtual machine 1 such as its process list, port group, group tag, and other data. The node 506 can include value "VM2" of the virtual machine 2 and other configuration data related to the virtual machine 2, as well as indicate that it is a virtual machine node. The node 509 can include value "VM3" of the virtual machine 3 and other configuration data related to the virtual machine 2 as well as indicate that it is a virtual machine node. The node 512 can include value "datastore1" and other configuration data as well as indicate that it is a virtual data store node. The node 515 can include value "webportgroup" and other configuration data as well as indicate that it is a port group node. The node 516 can include value "VM4" of the virtual machine 4 and other configuration data related to the virtual machine 4 as well as indicate that node 516 is a virtual machine node. The node 518 can include value "Host 18E" and other configuration data as well as indicate that node 518 is a host node.

The edge 521 can connect the node 503 to the node 515. The edge 521 can indicate a property "assigned" that connects the web port group "WebPortGroup" to virtual machine "VM1." This can indicate that the web port group "WebPortGroup" is assigned to virtual machine "VM1." The edge 524 can connect the node 503 to the node 512 and can indicate that the virtual data store "datastore1" is assigned to virtual machine "VM1."

The edge 527 can connect the node 503 to the node 506 and can indicate an affinity or affinity rule between virtual machine "VM1" and virtual machine "VM2." This can be a virtual machine to virtual machine (VM-VM) affinity rule. A VM-VM affinity rule specifies whether selected individual virtual machines should run on the same host or be kept on separate hosts.

A VM-VM affinity rule can be used to create affinity or anti-affinity between specified virtual machines. When an affinity indicates that the specified virtual machines should be together on the same host, for example, for performance reasons. An anti-affinity indicates that the specified virtual machines should be maintained on separate hosts, and should not be together on a single host. This can be used, for example, for continuity purposes if a problem occurs with one host, not all functionality would be placed at risk. In some cases, a VM-VM affinity rules can be maintained or applied using DRS.

The edge 530 can connect the node 506 to the node 515 and can indicate that the port group "WebPortGroup" is assigned to virtual machine "VM2." The edge 533 can connect the node 506 to the node 512 and can indicate that the virtual data store "datastore1" is assigned to virtual machine "VM2." The edge 536 can connect the node 509 to the node 515 and can indicate that the port group "WebPortGroup" is assigned to virtual machine "VM3." The edge 539 can connect the node 509 to the node 512 and can indicate that the virtual data store "datastore1" is assigned to virtual machine "VM3."

The edge 542 can connect the node 506 to the node 509 and can indicate an anti-affinity or affinity rule between virtual machine "VM2" and virtual machine "VM3." This can be a virtual machine to virtual machine (VM-VM) affinity rule that indicates antiaffinity.

The edge 545 can connect the node 509 to the node 516 and can indicate an affinity or affinity rule between virtual machine "VM2" and virtual machine "VM3." This can be a virtual machine to virtual machine (VM-VM) affinity rule that indicates affinity. In this case, the virtual machine "VM4" is not part of the same group as the virtual machine "VM3," but the affinity rule can in some cases cause the replication manager 209 or SDDC manager 203 to ensure this virtual machine is included in a replication, even if the replication target is the virtual machine group 403 (see FIG. 4), and does not include the virtual machine "VM4." Other dependencies can also be indicated in the property graph 220. This can ensure operability of virtual machine "VM3," which has an affinity rule with the virtual machine "VM4."

The edge 551 can connect the node 503 to the node 518 and can indicate an affinity rule between virtual machine "VM1" and host "host118E." This can be a virtual machine to host (VM-Host) affinity rule that specifies an affinity relationship between a virtual machine or group of virtual machines and a host or group of hosts, such as a DRS group or a virtual data store. In some cases, such a VM-Host affinity rule can also specify whether this VM-Host affinity rule is required or preferred. A VM-Host affinity rule can also indicate affinity or antiaffinity.

Other formats can be used. In some cases, the edge indicates a direction, such as an arrow pointing from one node to another can indicate additional data (e.g., which node is assignor and assignee). While shown as a graph, the property graph 220 can also be stored in other forms, such as in a list or table or other data that includes configuration data 218.

Figure 6:
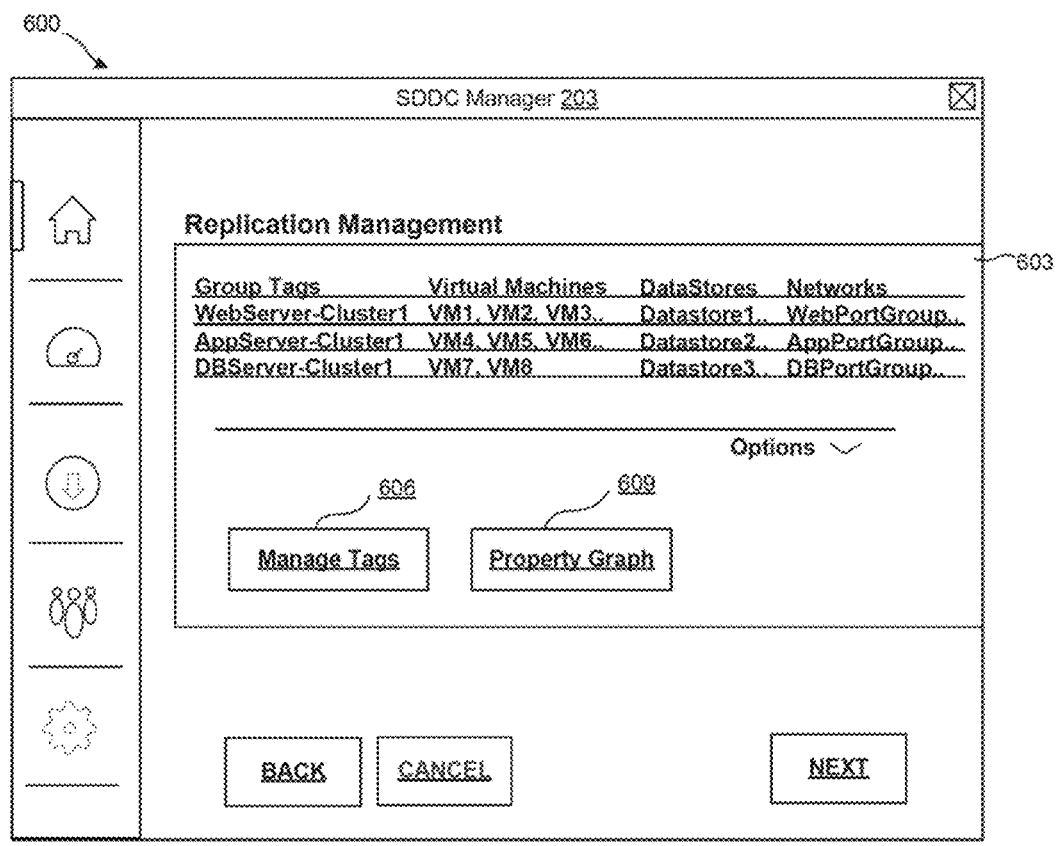
FIG. 6 is a drawing that illustrates functionalities implemented by components of the networked environment and rendered for display.

With reference to FIG. 6, shown is an example illustration of a user interface 600 generated by the SDDC manager 203 and displayed on a display device. The user interface 600 can show information regarding components of the networked environment 100 for replication. The user interface can have a replication management pane 603. In some cases, the replication management pane 603 can show indicate a table that includes group tags and their identifiers along with the associated virtual machines, storage resources, and network resources that are tagged with each of the group tags shown. The replication management pane 603 can also include user interface elements 606 and 609. The user interface element 606, when activated, can cause the SDDC manager 203 to show a user interface to manage, define, and assign tags to particular virtual machines or a group of virtual machines. The user interface element 609, when activated, can cause the SDDC manager 203 to display a property graph such as the property graph 220 of FIG. 5, or another property graph, show a user interface to manage, define, and assign tags to particular virtual machines or a group of virtual machines.

A number of software components are stored in the memory and executable by a processor. In this respect, the term "executable" means a program file that is in a form that can ultimately be run by the processor. Examples of executable programs can be a compiled program that can be translated into machine code in a format that can be loaded into a random access portion of one or more of the memory devices and run by the processor, expressed in a format such as object code that is capable of being loaded into a random access portion of the one or more memory devices and executed by the processor, or interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

A client device having a display can also be utilized, upon which a user interface generated by the SDDC manager 203, the workload tasks 224, workload tasks 227, workload tasks 230, or another application can be rendered. The client device can also include one or more input/output devices that can include, for example, a capacitive touchscreen or other type of touch input device, fingerprint reader, or keyboard.

Although the SDDC manager 203, workload tasks 224, workload tasks 227, workload tasks 230, or another applications and other various services and functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a computer-readable medium can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

What is claimed is:

1. A computer-implemented method, comprising:
   identifying, by at least one computing device, a process list of a respective virtual machine of a plurality of virtual machines associated with a first workload domain within a hyper-converged infrastructure comprising a rack and at least one host within the rack;
   generating, by the at least one computing device, a plurality of virtual machine groups from the plurality of virtual machines using k-means grouping based at least in part on the process list of the respective virtual machine, a subset of the plurality of virtual machines being grouped within a respective virtual machine group of the plurality of virtual machine groups;
   analyzing, by the at least one computing device, the subset of the plurality of virtual machines to determine a first set of resources associated with the respective virtual machine group, the first set of resources comprising a rack network resource of the rack and a host network resource of a host within the rack;
   generating, by the at least one computing device, a property graph comprising configuration data for the first set of resources associated with the respective virtual machine group, the configuration data comprising a network resource configuration comprising settings for the rack network resource and the host network resource; and
   configuring, by the at least one computing device, a second set of resources within a second workload domain using the property graph for the respective virtual machine group, the second set of resources being configured based at least in part on the settings for the rack network resource and the host network resource.

2. The computer-implemented method of claim 1, further comprising generating, by the at least one computing device, a replicated version of the subset of the plurality of virtual machines within the second workload domain, wherein the replicated version of the subset of the plurality of virtual machines utilizes the second set of resources.

3. The computer-implemented method of claim 1, further comprising:
   generating, by the at least one computing device, a user interface element that when activated assigns a tag to a particular virtual machine that is grouped within the respective virtual machine group; and
   assigning, by the at least one computing device, the tag to other virtual machines grouped within the subset of the plurality of virtual machines.

4. The computer-implemented method of claim 3, further comprising associating, by the at least one computing device, the tag with at least one resource of the first set of resources.

5. The computer-implemented method of claim 1, wherein the configuration data further comprises a virtual-machine-to-virtual-machine affinity rule.

6. The computer-implemented method of claim 1, wherein the configuration data further comprises a virtual-machine-to-host affinity rule.

7. A system, comprising:
   at least one computing device; and
   program instructions executable in the at least one computing device that, when executed, cause the at least one computing device to:
      identify a process list of a respective virtual machine of a plurality of virtual machines associated with a first workload domain within a hyper-converged infrastructure comprising a rack and at least one host within the rack;
      generate a plurality of virtual machine groups from the plurality of virtual machines using k-means grouping based at least in part on the process list of the respective virtual machine, a subset of the plurality of virtual machines being grouped within a respective virtual machine group of the plurality of virtual machine groups;
      analyze the subset of the plurality of virtual machines to determine a first set of resources associated with the respective virtual machine group, the first set of resources comprising a rack network resource of the rack and a host network resource of a host within the rack;
      generate a property graph comprising configuration data for the first set of resources associated with the respective virtual machine group, the configuration data comprising a network resource configuration comprising settings for the rack network resource and the host network resource; and
      configure a second set of resources within a second workload domain using the property graph for the respective virtual machine group, the second set of resources being configured based at least in part on the settings for the rack network resource and the host network resource.

8. The system of claim 7, wherein when executed the program instructions further cause the at least one computing device to generate a replicated version of the subset of the plurality of virtual machines within the second workload domain, wherein the replicated version of the subset of the plurality of virtual machines utilizes the second set of resources.

9. The system of claim 7, wherein when executed the program instructions further cause the at least one computing device to:
   generate a user interface element that when activated assigns a tag to a particular virtual machine that is grouped within the respective virtual machine group; and
   assign the tag to other virtual machines grouped within the subset of the plurality of virtual machines.

10. The system of claim 9, wherein when executed the program instructions further cause the at least one computing device to associate the tag with at least one resource of the first set of resources.

11. The system of claim 7, wherein the configuration data further comprises a virtual-machine-to-virtual-machine affinity rule.

12. The system of claim 7, wherein the configuration data further comprises a virtual-machine-to-host affinity rule.

13. The system of claim 7, wherein the configuration data further comprises a first naming convention for the first set of resources, and wherein when executed the program instructions further cause the at least one computing device to further configure the second set of resources with a second naming convention based at least in part on the first naming convention for the first set of resources.

14. A non-transitory computer-readable medium embodying program instructions executable in at least one computing device, wherein when executed, the program instructions cause the at least one computing device to:
   identify a process list of a respective virtual machine of a plurality of virtual machines associated with a first workload domain within a hyper-converged infrastructure comprising a rack and at least one host within the rack;
   generate a plurality of virtual machine groups from the plurality of virtual machines using k-means grouping based at least in part on the process list of the respective virtual machine, a subset of the plurality of virtual machines being grouped within a respective virtual machine group of the plurality of virtual machine groups;
   analyze the subset of the plurality of virtual machines to determine a first set of resources associated with the respective virtual machine group, the first set of resources comprising a rack network resource of the rack and a host network resource of a host within the rack;
   generate a property graph comprising configuration data for the first set of resources associated with the respective virtual machine group, the configuration data comprising a network resource configuration comprising settings for the rack network resource and the host network resource; and
   configure a second set of resources within a second workload domain using the property graph for the respective virtual machine group, the second set of resources being configured based at least in part on the settings for the rack network resource and the host network resource.

15. The non-transitory computer-readable medium of claim 14, wherein when executed the program instructions further cause the at least one computing device to generate a replicated version of the subset of the plurality of virtual machines within the second workload domain, wherein the replicated version of the subset of the plurality of virtual machines utilizes the second set of resources.

16. The non-transitory computer-readable medium of claim 14, wherein when executed, the program instructions further cause the at least one computing device to:
generate a user interface element that when activated assigns a tag to a particular virtual machine that is grouped within the respective virtual machine group; and
assign the tag to other virtual machines grouped within the subset of the plurality of virtual machines.

17. The non-transitory computer-readable medium of claim 16, wherein when executed, the program instructions further cause the at least one computing device to associate the tag with at least one resource of the first set of resources.

18. The non-transitory computer-readable medium of claim 14, wherein the configuration data further comprises a virtual-machine-to-virtual-machine affinity rule.

19. The non-transitory computer-readable medium of claim 14, wherein the configuration data further comprises a virtual-machine-to-host affinity rule.

20. The non-transitory computer-readable medium of claim 14, wherein the configuration data further comprises a first naming convention for the first set of resources, and when executed, the program instructions further cause the at least one computing device to further configure the second set of resources with a second naming convention based at least in part on the first naming convention for the first set of resources.

* * * * *